United States Patent

Peters

[11] Patent Number: 6,118,532
[45] Date of Patent: Sep. 12, 2000

[54] INSTRUMENT FOR DETERMINING STATIC AND/OR DYNAMIC LIGHT SCATTERING

[75] Inventor: Wilhelm Peters, Langen, Germany

[73] Assignee: ALV-Laser Vertriebsgesellschaft mbH, Langen, Germany

[21] Appl. No.: 09/050,556

[22] Filed: Mar. 30, 1998

[30] Foreign Application Priority Data

Mar. 28, 1997 [DE] Germany .......................... 197 13 200

[51] Int. Cl.⁷ .................................................. G01N 21/00
[52] U.S. Cl. ........................... 356/338; 356/340; 356/343
[58] Field of Search .................... 356/244, 246, 356/440, 335–343; 250/575, 574, 573

[56] References Cited

U.S. PATENT DOCUMENTS

| | | | |
|---|---|---|---|
| 4,779,003 | 10/1988 | Tatsuno | 356/336 |
| 5,120,978 | 6/1992 | Yamashita et al. | 356/339 |
| 5,129,723 | 7/1992 | Howie et al. | 356/336 |
| 5,135,302 | 8/1992 | Hirako | 356/339 |
| 5,155,543 | 10/1992 | Hirako | 356/343 |
| 5,280,272 | 1/1994 | Nagashima et al. | 356/340 |
| 5,710,625 | 1/1998 | Neumann et al. | 356/440 |

FOREIGN PATENT DOCUMENTS 38 13 718  11/1989  Germany .

*Primary Examiner*—Hoa Q. Pham
*Attorney, Agent, or Firm*—Kenyon & Kenyon

[57] ABSTRACT

The present invention relates to an instrument for determining the light scattered by a sample comprising a platform rotatable about an axis of rotation; a sample holder disposed along the axis of rotation; a light source for producing a beam of coherent light that can be focused on a sample in the sample holder; and a plurality of detectors disposed and rotatable about the axis of rotation and adapted so that each detector can be adjusted to focus on a common point along the axis of rotation by reference to the beam.

21 Claims, 4 Drawing Sheets

INSTRUMENT FOR DETERMINING STATIC AND/OR DYNAMIC LIGHT SCATTERING

FIELD OF THE INVENTION

The present invention relates to an instrument for determining static and/or dynamic light scattering. More particularly, this instrument involves a light source for producing coherent light and a plurality of detectors.

BACKGROUND OF THE INVENTION

Determining the dynamic and/or static light scattering makes it possible to determine the particle size, particle shape, diffusion coefficient, and molecular weight of substances. To make this determination, a light source emitting coherent light and a sensitive single-photon detector are used to measure the total light intensity (static light scattering) and changes in light intensity as a function of diffusion processes (dynamic light scattering) of a sample in a solution. Any change in the scattering angle and thus the wave vector of the scattered light provides additional information in studying either static or dynamic light scattering. The total intensity of scattered light measured for static light scattering increases with the volume of the sample and with the intensity of the incident light. For dynamic light scattering, changes in light intensity of the coherent scattered light emitted by the sample at a given time are compared with the scattered light emitted by the same sample at another point in time. Small sample volumes or, alternatively, when any desired liquid volume is to be used, coherent light must be used to ensure that coherent mixture of the scattered light takes place.

Instruments for determining light scattering must allow measurement of both static and dynamic light scattering. This, however, is only possible if a compromise is found between the use of large volumes for static light scattering and small volumes for dynamic light scattering.

Therefore, performing static and dynamic light scattering tests consecutively, using an optimized detector for each measurement, has been contemplated. This idea, however, has been rejected, since in consecutive measurements the sample being tested is no longer the same from test to test, and neither the optical nor the sample parameters are the same, but have changed during the time between the consecutive measurements. Obvious examples include dynamic changes in the sample due to jelling, polymerization, or crystallization occurring between two measurements, as well as samples with a high degree of heterogeneity. Consequently, comparable results cannot be expected with consecutive measurements in each of these mentioned cases.

The need to perform angle-dependent measurements and thus to modify the wave vector points produces another difficulty. That is, it must be ensured that it is always the same sample volume that is being measured when testing the sample with the most diverse scattering angles. This practice takes into account the theoretical dependence of the resulting effective scattering volume, allowing subsequent corrections, and prevents small inhomogeneities from resulting in fully unexpected results. In order to assure this, a goniometric procedure is normally performed. The sample is adjusted, so that it is located exactly in the center of rotation of a rotary platform with a swivel arm carrying a detector. The laser light is adjusted to the sample in the center of rotation. This ensures that the same scattering volume is measured in the entire scattering angle range as long as the required adjustment is accurate along all axes, i.e., both in the horizontal and vertical directions, at the inclination or angular deviation of the detector and the laser beam.

Although these adjustments must usually be very accurate and require an accuracy better than 10 $\mu$m for most parameters, they can be made within these strict parameters if the detector is brought to the zero-degree scattering angle position, where it is hit directly by the laser beam. The procedure for adjusting a commercially available device for measuring light scattering is known.

Nevertheless, for many samples simultaneous measurement of static and dynamic light scattering using consecutive measurements from several scattering angles represents a problem. Satisfactory results are not always obtained in consecutive measurements whether due to sample instability caused by jelling, polymerization, and/or crystallization, or due to other limitations such as the measuring time available for each sample. There are also standard tests where static and dynamic light scattering are measured consecutively from different scattering angles, for example, in measuring particle size, without the test results being necessarily affected. The scattered light may be observed simultaneously by a plurality of detectors from different viewing angles. See, German Patent 38 13 718 A1. This, however, fails to provide a solution in that it is extremely costly to adjust a plurality of detectors so that each detector receives scattered light from the same scattering volume. Moreover, the number of scattering angles available for measuring is limited by the number of the detectors used around the sample.

SUMMARY OF THE INVENTION

An object of the invention is to develop an instrument for determining static and/or dynamic light scattering allowing simultaneous measurement of a sample in a solution from a plurality of scattering angles by means of a plurality of detectors, whereby simple but accurate adjustment of the detectors can be made.

This object is achieved with an instrument for determining static and/or dynamic light scattering comprising a light source for producing a laser beam directed at a sample contained in a cylindrical cell, the sample being located in the center of a rotary platform, coaxially to its axis of rotation and perpendicularly to the laser beam, characterized in that a plurality of detectors are arranged at any angles next to one another for measuring the light scattered by the sample, and each detector has an adjusting device with which the detectors on the rotary platform can be adjusted in their vertical or horizontal, such that the detector aligns with the laser beam facing towards the test cell, zero-degree position in relation to the laser beam with the help of the laser beam so that after adjustment all detectors are aligned to a common point in the center of rotation.

The laser beam is used as a reference for establishing coplanarity of the detectors in the plane of rotation and for focusing the detectors on a common point which is centered about the center of the sample about the axis about which the detectors rotate.

DETAILED DESCRIPTION OF PREFERRED EMBODIMENTS

The present invention will now be described in detail for specific preferred embodiments of the invention, it being understood that these embodiments are intended only as illustrative examples and the invention is not to be limited thereto.

The detectors arranged on the rotary platform can be adjusted in their respective zero-degree positions using the laser beam and rotary platform by aligning all detectors to a common point in the center of rotation. The laser beam acts as an axis parallel to the plane of the rotary platform and perpendicular to the axis of rotation of the rotary platform. Using the rotary platform, the viewing angle of the detectors can be changed by any angular value while preserving the adjustment to a common point in the center of rotation. Up to 30, preferably 4 to 16 detectors, arranged 5° to 30°, preferably 10° to 20°, apart can be advantageously secured on a rotary platform.

In general, no more than 10 to 20 measurements from different angles are required for measuring the static or dynamic scattered light, although in special cases measurements at up 15 to 100 different scattering angles (Lorenz-Mie scattering analysis) are performed. The instrument according to this invention allows the number of scattering angles available for measurements to be increased indefinitely through stepwise changes in the angular position of the rotary platform.

Any detectors suitable for scattered light measurements can be used with the instrument according to this invention. Both conventional apertured diaphragm detectors and fiber detectors having a combination of a gradient index lens with an optical fiber of a different fiber diameter and numerical aperture can be used.

Figure 1:
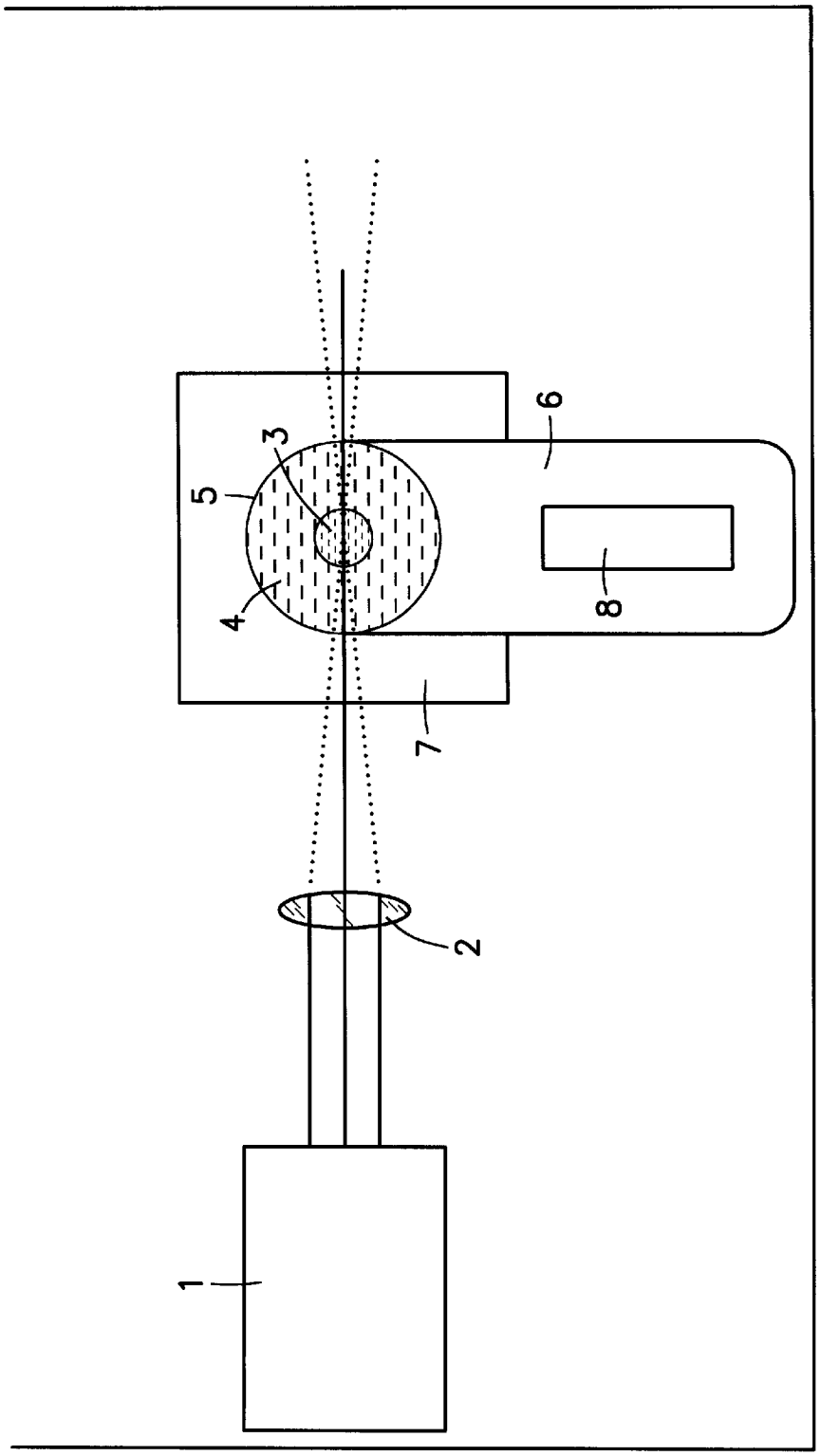
FIG. 1 illustrates a goniometer schematically (prior art).

Goniometric instruments allowing the scattering angle or its equivalent wave vector to be varied have long been used for measuring dynamic or static scattered light. The typical design of such a goniometer is illustrated in FIG. 1, which shows a laser source 1, a focusing device 2, a sample holder 3, surrounded by a liquid 4, which has the same refraction index as the test cell glass and is contained in a container 5, made of a transparent material with the same refraction index as the test cell glass. A detector 8 suitable for measuring scattered light is located on a swivel arm 6 and is in turned attached to a rotary platform 7.

Figure 2:
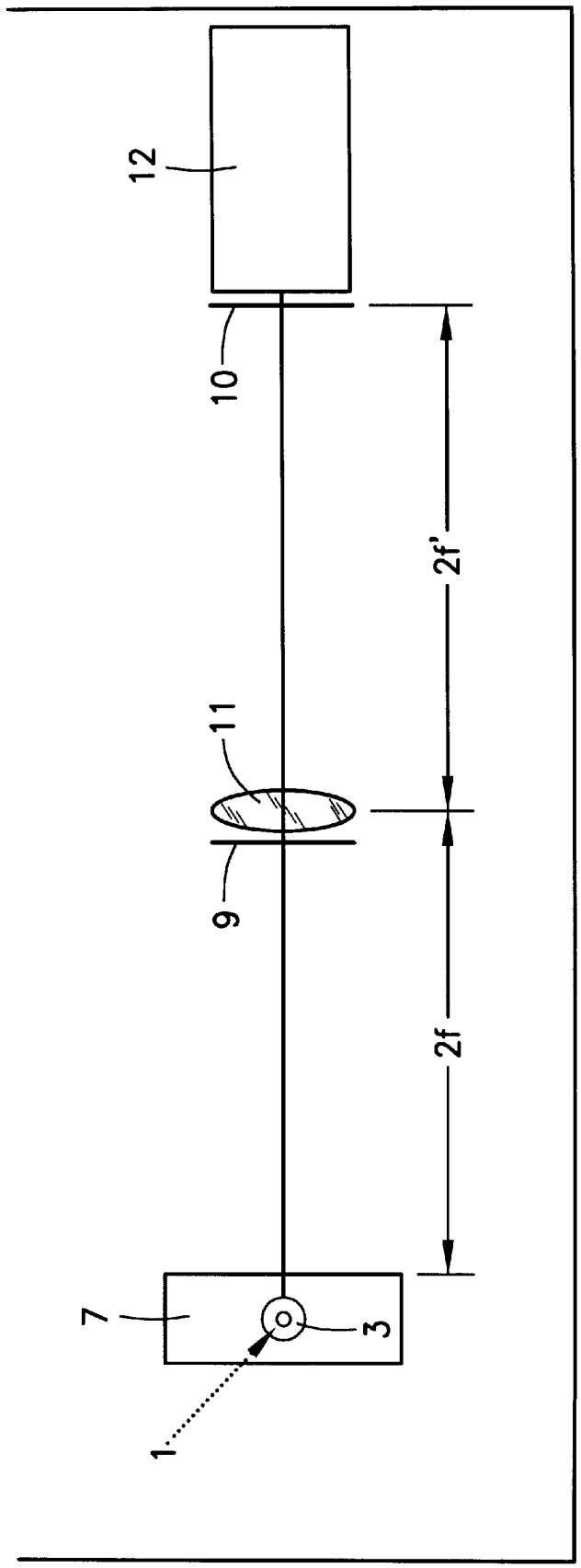
FIG. 2 illustrates an apertured detector (prior art).

The detector may be an apertured detector as shown in FIG. 2. The apertured detector has a first aperture 9 with a selected aperture diameter, located in the proximity of focusing lens 11 and at a distance from the scattering center equal to twice the focal distance, as well as a second aperture 10 with approximately the same aperture diameter as the first 10 aperture, at a distance from the focusing lens that is also equal to twice the focal distance. Either a photomultiplier or a suitable photodiode can be used as single-photon detector 12.

Figure 3:
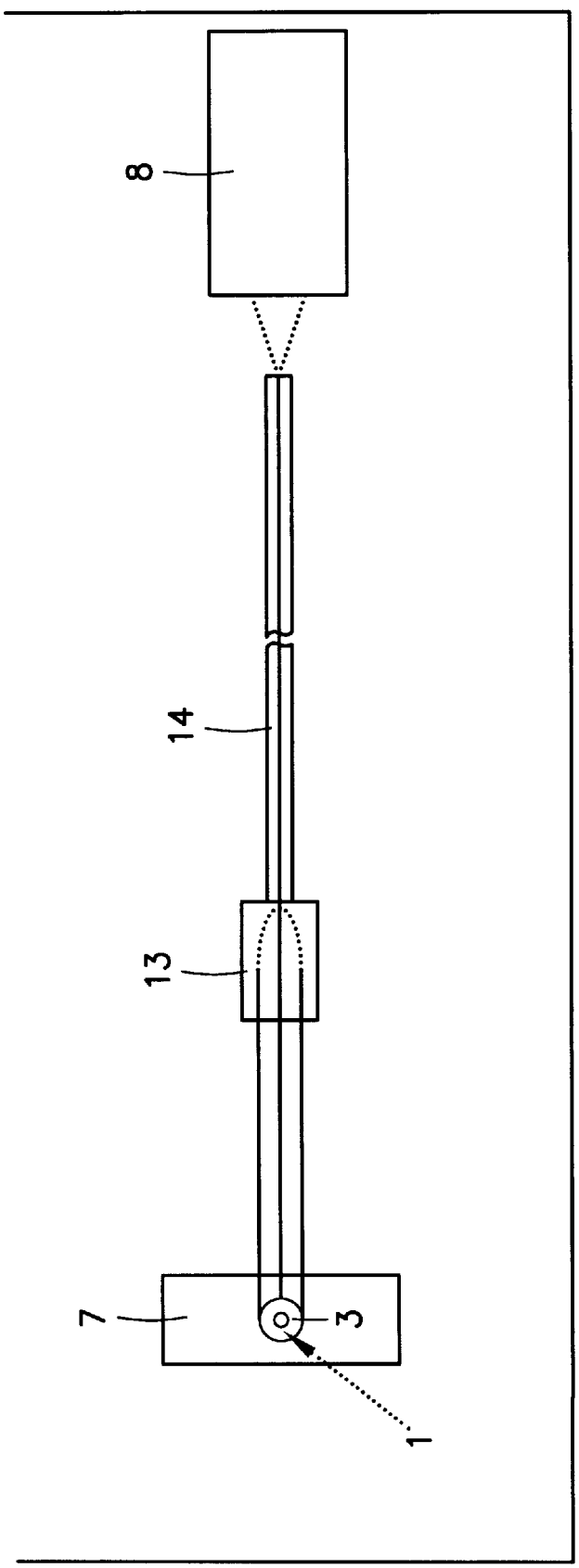
FIG. 3 illustrates a fiber detector (prior art).

The fiber detector illustrated in FIG. 3 comprises a gradient index lens 13 and an optical fiber 14 with a small numerical aperture (numerical aperture 0.1 to 0.2) and a small core diameter (5 to 25 $\mu$m). The distance to the scattering center may have any value, but is usually at least 10 mm. The light is focused by gradient index lens 13 and conveyed in the optical fiber to detector 8.

Figure 4:
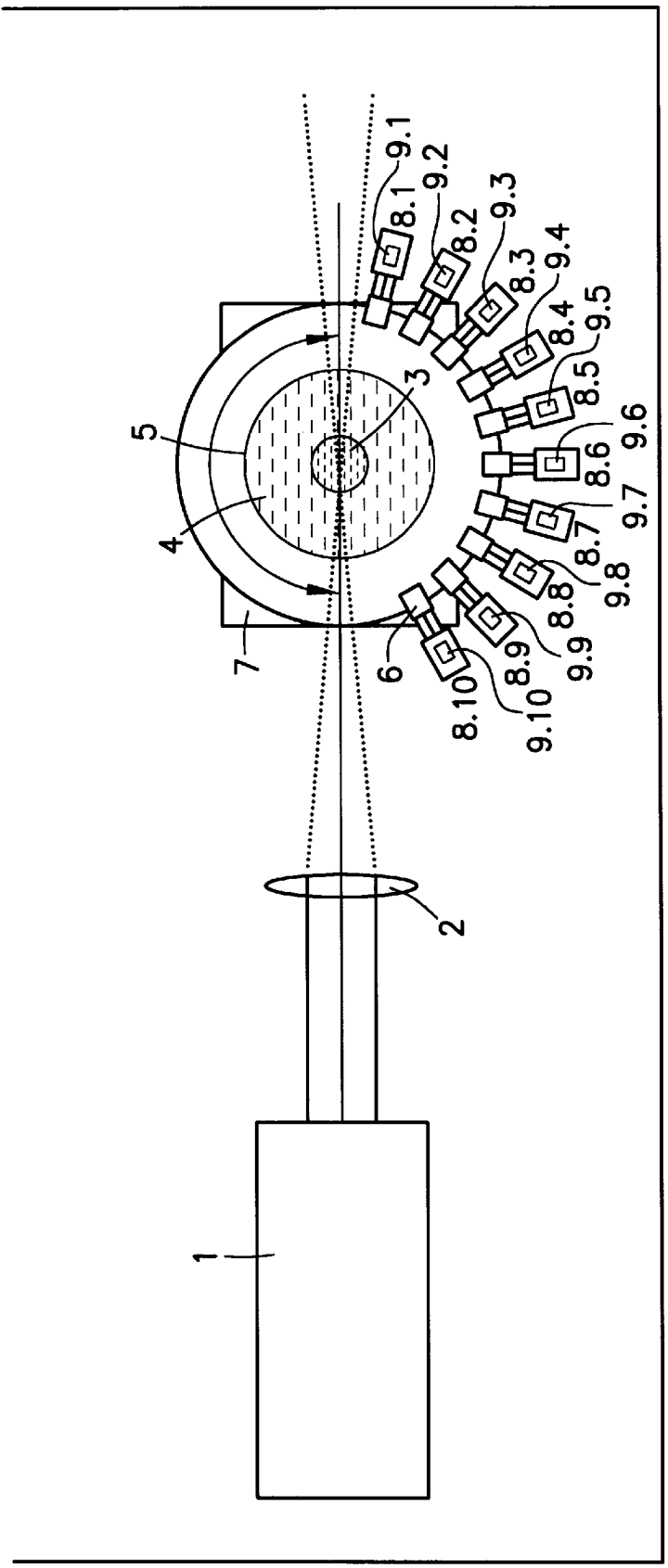
FIG. 4 illustrates an embodiment of an instrument for determining light scattering.

FIG. 4 shows the instrument according to this invention with a laser source 1, a focusing device 2, and a sample holder with test cell, which may be of cylindrical shape, and sample 3, surrounded by a liquid 4 with a refraction index equal to that of the cell glass, contained in a container 5 made of a transparent material that also has a refraction index of the test cell glass. A plurality of detectors (8.1 through 8.10), each detector having an adjusting device (9.1 through 9.10) are located on swivel arm 6 of rotary platform 7, in this case 15° apart. The detectors can be either apertured detectors or fiber detectors.

What is claimed is:

1. An instrument for determining light scattering, comprising a light source for producing a laser beam directed at a sample contained in a test cell, the sample being located in the center of a rotary platform, coaxially to its axis of rotation and perpendicularly to the laser beam, wherein a plurality of detectors are arranged at any angles next to one another for measuring the light scattered by the sample, and each detector has an adjusting device with which the detectors on the rotary platform can be adjusted in their zero-degree position in relation to the laser beam, the zero degree position being that position initially obtained for each detector by bringing the detector into axial alignment with the laser beam, so that the laser beam acts as a reference axis parallel to the plane of the rotary platform and perpendicular to the axis of rotation of the rotary platform, so that after adjustment all detectors are aligned to a common point in the center of rotation.

2. The instrument of claim 1, further comprising a focusing device which focuses the laser beam on the sample contained in the test cell.

3. The instrument of claim 1, wherein the instrument is adapted to determining static light scattering.

4. The instrument of claim 1, wherein the instrument is adapted to determining dynamic light scattering.

5. The instrument of claim 1, wherein the instrument is adapted to determining static and dynamic light scattering simultaneously.

6. The instrument of claim 1 wherein the detectors arranged on the platform can be adjusted in their respective zero-degree positions using the laser beam by aligning all of the detectors to the common point located centrally on the platform.

7. The instrument of claim 1 wherein the detectors are arranged at angles whereby the angles can be increased indefinitely through stepwise changes in the angular position of the platform.

8. The instrument of claim 1 wherein the detector includes a device which is at least one member selected from the group consisting of a photomultiplier and a photodiode.

9. The instrument of claim 1 wherein the detectors are apertured diaphragm detectors.

10. The instrument of claim 9 wherein the apertured diaphragm detector includes a first aperture with a selected aperture diameter and a focal distance such that the first aperture is located in the proximity of the focusing lens, and at a distance from the common point in the center of rotation equal to twice the focal distance, as well as a second aperture with approximately same aperture diameter as the first aperture, at a distance from the focusing lens equal to twice the focal distance.

11. The instrument of claim 1 wherein the detectors are fiber optic detectors.

12. The instrument of claim 11 wherein the fiber optic detector comprises a gradient index lens and an optical fiber with a numerical aperture of 0.1 to 0.2 and a small core diameter of 5 to 25 $\mu$m.

13. The instrument of claim 1, wherein up to 30 detectors are attached to the platform.

14. The instrument of claim 1, wherein 4 to 16 of the detectors are attached to the platform.

15. The instrument of claim 1, wherein the detectors are arranged 5° to 30° apart on the platform.

16. The instrument of claim 1, wherein the detectors are arranged 10° to 20° apart on the platform.

17. The instrument of claim 1, wherein the test cell is a cylindrical cell.

18. An instrument for determining the light scattered by a sample comprising a platform rotatable about an axis of rotation; a sample holder disposed along the axis of rotation; a light source for producing a beam of coherent light that can be focused on a sample in the sample holder; and a plurality of detectors disposed and rotatable about the axis of rotation and each detector has an adjusting device with which detectors can be adjusted in their zero-degree position to focus on a common point along the axis of rotation by reference to the beam.

19. The instrument of claim 18, wherein the instrument is adapted to determining static light scattering.

20. The instrument of claim 18, wherein the instrument is adapted to determining dynamic light scattering.

21. The instrument of claim 18, wherein the instrument is adapted to determining static and dynamic light scattering simultaneously.

* * * * *